(12) United States Patent
Margolis

(10) Patent No.: US 7,625,081 B2
(45) Date of Patent: Dec. 1, 2009

(54) APPARATUS AND METHOD OF MANUFACTURE FOR PAPER FRAMED READING GLASSES

(76) Inventor: Mark Margolis, 6860 Canby Ave., Ste. #120, Reseda, CA (US) 91335

(\*) Notice: Subject to any disclaimer, the term of this patent is extended or adjusted under 35 U.S.C. 154(b) by 0 days.

(21) Appl. No.: 11/876,611

(22) Filed: Oct. 22, 2007

(65) Prior Publication Data

US 2009/0033862 A1 Feb. 5, 2009

Related U.S. Application Data

(60) Provisional application No. 60/953,424, filed on Aug. 1, 2007.

(51) Int. Cl.
*G02C 1/00* (2006.01)
(52) U.S. Cl. .......................................... 351/41; 351/178
(58) Field of Classification Search .................. 351/63, 351/51, 52, 115, 111, 41, 158, 178; 359/465
See application file for complete search history.

(56) References Cited

U.S. PATENT DOCUMENTS 2,323,518 A \* 7/1943 Cochran ..................... 359/465
4,560,258 A \* 12/1985 Stanley et al. ............... 351/115

\* cited by examiner

*Primary Examiner*—Hung X Dang
(74) *Attorney, Agent, or Firm*—Arent Fox LLP

(57) ABSTRACT

A pair of glasses includes a paper frame having at least one aperture and a substrate arranged with each of said at least one aperture to magnify objects for a user when viewing through each of said at least one aperture.

30 Claims, 2 Drawing Sheets

APPARATUS AND METHOD OF MANUFACTURE FOR PAPER FRAMED READING GLASSES

CROSS-REFERENCE TO RELATED APPLICATIONS

This application is based upon, and claims the benefit of priority under 35 U.S.C. § 119(e) U.S. provisional application Ser. No. 60/953,424, filed on Aug. 1, 2007, entitled "Apparatus and Method of Manufacture for Paper Framed Reading Glasses" the contents of which are incorporated herein by reference.

BACKGROUND

1. Field

The present disclosure relates generally to reading eyeglasses, and more particularly, to the manufacture and use of paper framed reading glasses configured to be an inexpensive alternative to traditional reading glasses.

2. Background

Traditionally, reading eyeglass frames have been commonly made from metal or plastic. Reading lenses, originally made from glass, are now made from various types of plastic, including polycarbonate—reducing the danger of breakage and weighing less than glass lenses. Some currently used plastics also have more advantageous optical properties than glass, such as better transmission of visible light and greater absorption of ultraviolet light. Conventional plastic or glass reading lenses, however, are relatively thick due to their convex shape—thereby creating the lenses with magnification properties. As an inexpensive alternative to the structural material previously mentioned, a user may wish to obtain paper framed glasses with polymer sheet magnifiers as lenses. Thus, there is a need in the art for the latter mentioned glasses, which, although inexpensive, may magnify viewing material as effectively as a conventional pair of glasses.

SUMMARY

One aspect of paper framed reading glasses is disclosed. A pair of glasses includes a paper frame having at least one aperture and a substrate arranged with each of said at least one aperture to magnify objects for a user when viewing through each of said at least one aperture.

Another aspect of paper framed reading glasses is disclosed. A pair of glasses includes a paper frame having at least one aperture and a magnification substrate traversing each of said at least one aperture.

Yet another aspect of paper framed reading glasses is disclosed. A pair of glasses includes a paper frame having at least one aperture and means for magnifying objects positioned over each of said at least one aperture.

One aspect of a method for manufacturing a pair of glasses is also disclosed. A method for manufacturing a pair of glasses includes forming a first one of the paper frame layers on one half of a sheet of paperboard and a second one of the paper frame layers on another half of the sheet of paperboard, each of the first and second paper frame layers having two apertures, placing a first magnification substrate over one of the apertures in the first one of the paper frame layers and a second magnification substrate over the other one of the apertures on the first one of the paper frame layers, folding said sheet of paperboard so that the apertures in the first one of the paper frame layers align with the apertures in the second one of the paper frame layers, and cutting said paper framed eyeglasses from said folded sheet of paperboard.

Another aspect of paper framed reading glasses is disclosed. A pair of glasses includes a two layer paper frame having at least one aperture and a magnification substrate extending across each of said at least one aperture and bound between the two layers of said paper frame.

These, as well as other objects, features and benefits will now become clear from a review of the following detailed description of illustrative embodiments and the accompanying drawings.

DESCRIPTION OF DRAWINGS

Aspects of the present invention are illustrated by way of example, and not by way of limitation, in the accompanying drawings wherein.

DETAILED DESCRIPTION

The detailed description set forth below in connection with the appended drawings are intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details.

Figure 1:
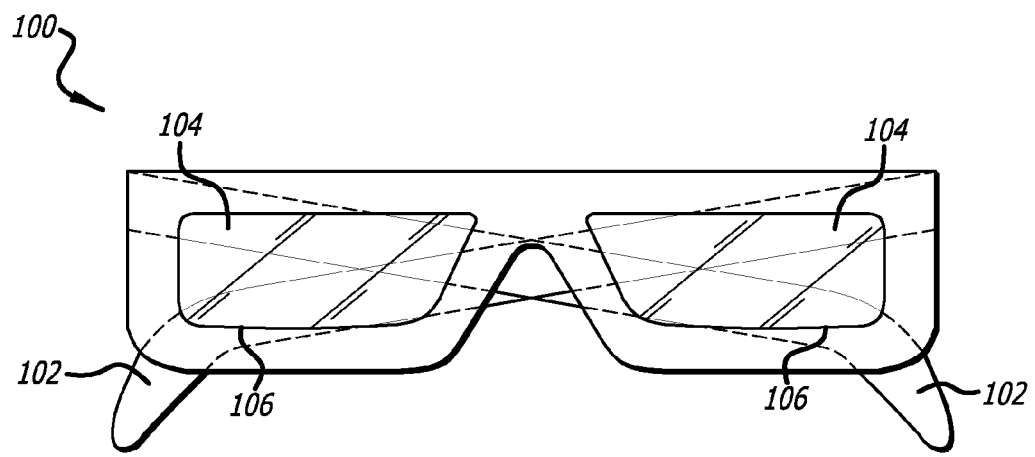
FIG. 1 illustrates a perspective view of a paper framed pair of eyeglasses with magnification substrate.

FIG. 1 illustrates a perspective view of a paper framed pair of eyeglasses with magnification substrate. Although eyeglasses are described herein in their traditional sense, the term eyeglass and eyeglasses are used interchangeably to refer to binocular and monocular configurations with paper frames with or without temple arms or ear pieces 102. For example, one of ordinary skill in the art may appreciate that the configuration disclosed may apply equally to: (1) reading eyeglasses with two lenses, one for each eye for binocular vision; (2) a reading magnifier that may be used over one eye, i.e., a monocle for monocular vision; or (3) a single magnifying lens mounted in a paper frame large enough for two eyes. The paper framed eyeglasses 100 may have a pair of ear pieces 102 and a pair of apertures 106. The apertures 106 may be any opening, i.e., any shape or size, that would allow a user to see, observe, inspect, examine, or otherwise perceive an object through the opening. The pair of ear pieces 102 may facilitate a user's ability to affix the paper framed eyeglasses 100 temporarily to one's face. Alternatively, the paper framed eyeglasses 100 may forgo the presence of any ear pieces 102 and may simply be held in the user's hand. Once in the user's hand, the paper framed glasses may be manually placed over one's eyes for viewing objects through the apertures 106. The use of the paper framed eyeglasses 100 without ear pieces 102 is referred to as a hand held or a lorgnette.

The paper framed eyeglasses 100 also may have a thin magnification substrate 104 that may be mounted, or otherwise connected or attached, into each of the apertures 106 by adhesive, glue, or any other bonding agent, as well as a friction fit. The substrate 104 provides the means for magnification by implementing concentric annular sections about the entire substrate 104. As will be explained in greater detail later, this arrangement may provide the user with the ability to use the paper framed eyeglasses 100 for reading and/or magnifying miscellaneous objects. Due to the paper framed eyeglass construction, the paper board may be printed with advertisements, notices, or other commercial indicia that may indicate the manufacturing or distribution information.

Figure 2A:
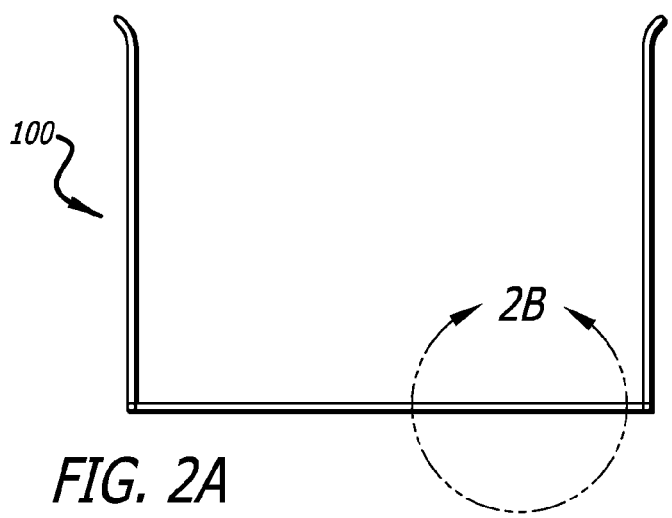
FIG. 2 illustrates a top elevational view of a paper framed pair of eyeglasses with magnification substrate.
Figure 2B:
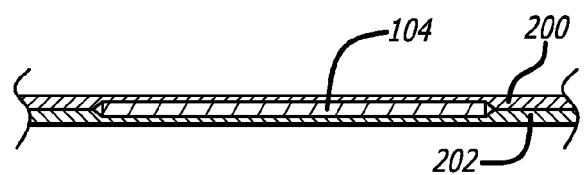

FIG. 2 illustrates a top elevational view of a paper framed pair of eyeglasses with a magnification substrate. FIG. 2 illustrates the relative thin construction of the paper framed eyeglasses 100. The paper frame 100 may be produced in different sizes, one to fit adults and one for children. The magnification substrate 104, or flat lenses, are carefully designed in conjunction with the frame's 100 shape and size in order to create a flat structure that is easily portable, bendable, and convenient. The substrate 104 may be a sheet magnifier that comprises many very narrow concentric ring-shaped lenses, such that the combination acts as a single lens but is much thinner than conventional convex lenses. This arrangement is known as a Fresnel lens. Since the substrate 104 is thin, it may be incorporated into the paper framed eyeglasses 100 by inserting between the top layer 200 and the bottom layer 202 during the manufacturing process whereby the substrate 104 traverses the apertures 106. Alternatively, the substrate 104 may be incorporated into the paper framed eyeglasses 100 by attaching to a single layer 200 or 202.

Figure 3A:
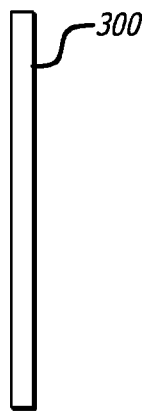
FIGS. 3a, 3b, and 3c illustrate a perspective view of: (a) a substrate before embossing; (b) a substrate after embossing; and (c) a traditional convex magnification lens.
Figure 3B:
Figure 3C:
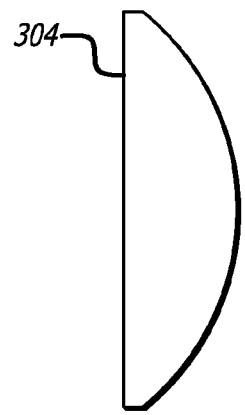

FIGS. 3a, 3b, and 3c illustrate a perspective view of: (a) a substrate before embossing; (b) a substrate after embossing; and (c) a traditional convex magnification lens. A substrate 104 may be any clear polymer, polyester, vinyl, or suitable polyurethane material that is capable of being embossed or otherwise molded into concentric annular sections. FIG. 3a is a depiction of what the substrate 300 may resemble before undergoing the embossing process. The embossing process may be performed by using a copper diamond bit lathe to create a master impression. The master impression may then be used to stamp, emboss, or imprint its pattern onto the receiving substrate 104. The master, and thus, the receiving substrate 104, may be produced of various magnifying powers, shapes, and sizes.

FIG. 3b is a depiction of what the substrate 104 may resemble after undergoing the embossing process. The embossing process creates a flat lens with 3D information that reproduces the magnification properties of a conventional convex lens. Convex lenses have positive dioptric value and are generally used to correct hyperopia (farsightedness) or to allow people with presbyopia (the limited accommodation of advancing age) to read at close range. Typical glasses for moderate presbyopia will have a power of +1.00 to +5.00 diopters. Thus, by incorporating the 3D information inherent to a conventional convex lens onto a flat lens, a user is able to avail itself of the magnification properties of a flat substrate 104 without the unnecessary thickness and weigh associated with conventional glass lenses (See FIG. 3c).

Figure 4:
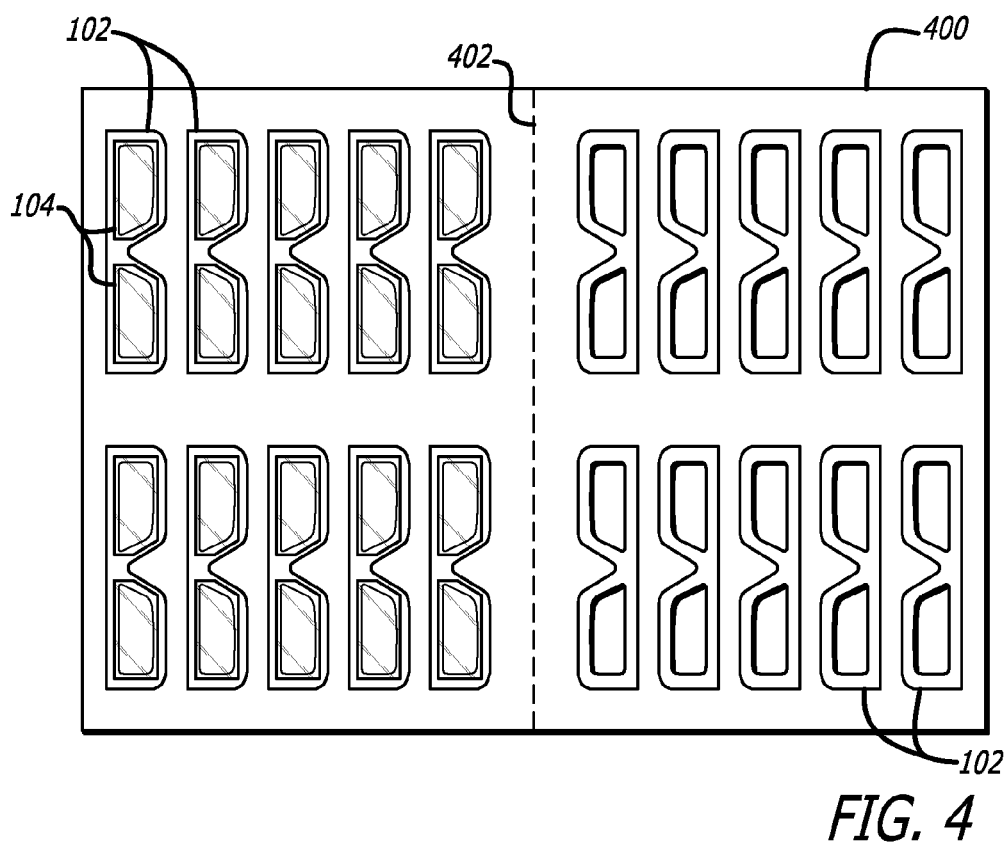
FIG. 4 illustrates a top elevational view of a paperboard sheet prior to manufacturing the paper framed pair of eyeglasses with magnification substrate.

FIG. 4 illustrates a top elevational view of a paperboard sheet prior to manufacturing the paper framed pair of eyeglasses with a magnification substrate. The manufacturing process may be broken down into three distinct phases: (1) paper frame forming; (2) lens creation (discussed above); and (3) decoration and packaging (optional). The frame 102 is made from cardboard, or paperboard, and is typically formed by using a machine that is able to cut multiple patterns onto a sheet of paperboard 400. In the first step of this process, a sheet of paperboard 400 is prepared so that the exact size and shape of the desired frame 102 is cut on both halves of the sheet of paperboard 400. Next, pre-fabricated embossed substrates 104 are placed over the apertures of half of the frames 102. The embossed substrate 104 may be fused to the underlying paperboard by any adhesive, glue, or other bonding agent. Once the substrate 104 has been attached to the underlying sheet of paperboard 400, the sheet of paperboard is folded in half about a score 402. The folding process must align the two layers of paperboard so that the apertures are concentric with the embossed substrate 104 positioned between both layers, thus, manufacturing a three layer construction paper frame. Once the sheet of paperboard 400 has been folded and further adhesive has been applied to keep both halves together, the plurality of two layered paper frames may be manually or automatically removed from the mold. Alternatively, in lieu of the three layer construction previously described wherein the substrate 104 is trapped between two layers of paperboard, one of ordinary skill in the art could similarly forgo the second layer of paperboard 400 and merely attach the embossed substrate 104 to a single sheet of paperboard 400. This latter described construction is referred to as open-back construction.

While the specification describes particular embodiments of the present invention, those of ordinary skill can devise variations of the present invention without departing from the inventive concept. Also, the previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language of the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A pair of glasses, comprising:
   a paper frame having at least one aperture; and
   an embossed substrate arranged with each of said at least one aperture to magnify objects for a user when viewing through each of said at least one aperture.

2. The pair of glasses of claim 1 wherein said paper frame further comprises two ear pieces.

3. The pair of glasses of claim 2 wherein said embossed substrate comprises magnification properties.

4. The pair of glasses of claim 3 wherein said embossed substrate comprises a lens having a set of concentric annular sections.

5. The pair of glasses of claim 4 wherein said set of concentric annular sections have a diopter ranging from +1 to +5.

6. The pair of glasses of claim 3 wherein said embossed substrate comprises a Fresnel lens.

7. The pair of glasses of claim 3 wherein said substrate comprises polyester or vinyl.

8. A pair of glasses, comprising:
a paper frame having at least one aperture; and
a magnification substrate traversing each of said at least one aperture,
wherein said magnification substrate comprises an embossed substrate.

9. The pair of glasses of claim 8 wherein said paper frame further comprises two ear pieces.

10. The pair of glasses of claim 9 wherein said embossed substrate comprises magnification properties.

11. The pair of glasses of claim 10 wherein said embossed substrate comprises a lens having a set of concentric annular sections.

12. The pair of glasses of claim 11 wherein said set of concentric annular sections have a diopter ranging from +1 to +5.

13. The pair of glasses of claim 10 wherein said embossed substrate comprises a Fresnel lens.

14. The pair of glasses of claim 10 wherein said substrate comprises polyester or vinyl.

15. A pair of glasses, comprising:
a paper frame having at least one aperture; and
means for magnifying objects positioned over each of said at least one aperture,
wherein said magnifying means comprises an embossed substrate.

16. The pair of glasses of claim 15 wherein said paper frame further comprises two ear pieces.

17. The pair of glasses of claim 16 wherein said embossed substrate comprises magnification properties.

18. The pair of glasses of claim 17 wherein said embossed substrate is a lens having a set of concentric annular sections.

19. The pair of glasses of claim 18 wherein said embossed substrate is comprised of polyester or vinyl.

20. The pair of glasses of claim 19 wherein said set of concentric annular have a diopter ranging from +1 to +5.

21. A method for manufacturing a pair of glasses, comprising:
forming a first one of the paper frame layers on one half of a sheet of paperboard and a second one of the paper frame layers on another half of the sheet of paperboard, each of the first and second paper frame layers having two apertures;
placing a first magnification substrate over one of the apertures in the first one of the paper frame layers and a second magnification substrate over the other one of the apertures on the first one of the paper frame layers, wherein said first and second magnification substrates comprise an embossed substrate;
folding said sheet of paperboard so that the apertures in the first one of the paper frame layers align with the apertures in the second one of the paper frame layers; and
cutting said paper framed eyeglasses from said folded sheet of paperboard.

22. The method of claim 21 further comprising scoring said sheet of paperboard so as to facilitate folding.

23. The method of claim 22 wherein said first and second magnification substrates comprise a polyester or vinyl material having a set of concentric annular sections for magnification.

24. The method of claim 23 wherein said first and second magnification substrates comprise Fresnel lenses.

25. A pair of glasses, comprising:
a two layer paper frame having at least one aperture; and
a magnification substrate extending across each of said at least one aperture and bound between the two layers of said paper frame,
wherein said magnification substrate comprises an embossed substrate.

26. The pair of glasses of claim 25 wherein said paper frame further comprises two ear pieces.

27. The pair of glasses of claim 26 wherein said magnification substrate comprises a lens having a set of concentric annular sections.

28. The pair of glasses of claim 27 wherein said set of concentric annular sections have a diopter ranging from +1 to +5.

29. The pair of glasses of claim 28 wherein said magnification substrate comprises polyester or vinyl.

30. The pair of glasses of claim 27 wherein said magnification substrate comprises a Fresnel lens.

* * * * *